United States Patent Office 3,419,540
Patented Dec. 31, 1968

3,419,540
—N=N— GROUP-CONTAINING ISONITRILES
Uwe Fetzer and Ivar Ugi, Leverkusen, Günter Unterstenhöfer, Opladen, and Ingeborg Hammann, Cologne, Germany, assignors to Farbenfabriken Bayer Aktiengesellschaft, Leverkusen, Germany, a corporation of Germany
No Drawing. Filed May 18, 1965, Ser. No. 456,835
Claims priority, application Germany, May 24, 1964,
F 42,940
10 Claims. (Cl. 260—143)

The present invention relates to particular —N=N— group-containing isonitriles or isocyanides which possess biocidal properties, their compositions, as well as the production and use thereof.

It is known that aliphatic and mononuclear araliphatic isonitriles containing 13–26 carbon atoms can be used as insecticides (see U.S. Patent No. 3,012,932).

It is an object of the present invention to provide —N=N— group-containing isonitriles having particular biocidal effectiveness generally more pronounced than that of prior art biocides.

It is another object of the present invention to provide isonitriles of the foregoing type in the form of compositions with carrier vehicles, especially dispersible carrier liquids and dispersible carrier solids, for use as biocidal preparations.

It is another object of the present invention to provide such compositions which contain a biocidally effective amount of the isonitrile in question.

It is another object of the present invention to provide a process for the production of such particular —N=N— group-containing isonitriles or isocyanides starting from formamides by elimination of water in the presence of a water-eliminating acyl halide and a base.

It is still another object of the present invention to provide such a process which is carried out in a suitable reaction medium, such as a solution or suspension, and especially an inert organic solvent.

It is still another object of the present invention to provide a production process of the foregoing type carried out within a very wide temperature range, including temperatures below 0° C. as well as above 0° C., and for example up to the boiling temperature of water.

It is a still further object of the present invention to provide a method of using —N=N— group-containing isonitriles or isocyanides as biocidal agents, and especially insecticidal, acaricidal, and fungicidal agents, for hygiene control and even for plant protection control with respect to plant fungus diseases.

It is still another object of the present invention to provide a method of using the particular compounds of the foregoing type by applying such compounds to members of lower biological orders and their habitat in a biocidally effective amount.

It is still another object of the present invention to provide a more specific method of combating pests, such as insects and acarids, or fungi, by applying to such pests, i.e., insects or acarids, or to such fungi, a biocidally effective amount of an azo group-containing isonitrile or isocyanide of the instant type.

Other and further objects of the present invention will become apparent from a study of the within specification and accompanying examples.

It has been found in accordance with the present invention that particular isonitriles of the general formula $$(CN)_m A - N = N - A'(NC)_n$$
$$\underset{X}{|} \quad (I)$$

wherein
A and A', which may be the same or different, represent optionally substituted divalent aromatic radicals, optionally substituted arylene-carbonyl radicals or optionally substituted arylene-sulfonyl radicals,
X represents a free electron pair, an oxygen atom or a nitrogen atom connected with A' to form a ring, and
$m$ and $n$ represent 0, 1, 2, or 3, the sum of $m$ and $n$ being 1–4, exhibit strong biocidal properties.

The new isonitriles of general Formula I in accordance with the present invention are obtained when formamides of the general formula $$(OHC-NH-)_m A - N = N - A'(-NH-CHO)_n$$
$$\underset{X}{|} \quad (II)$$

wherein A, A', X, $m$ and $n$ have the foregoing meaning, are reacted with water-eliminating acyl halides in the presence of bases.

Surprisingly, the particular isonitriles or isocyanides provided in accordance with the present invention, i.e., of the type represented by general Formula I noted above, in contradistinction to known compounds, such as aliphatic and mononuclear araliphatic isonitriles containing 13–26 carbon atoms, are odorless and more pronounced in their biocidal effectiveness. Thus, the instant isonitriles or isocyanides represent an enrichment of the art in providing superior active biocidal agents possessing more varied and stronger biocidal potency and action than corresponding known isonitriles.

In accordance with a particular embodiment of the present invention, for instance, when 4-formylamino-2',3-dimethyl-azobenzene is reacted with phosgene and triethylamine, the course of the reaction can be represented by the following equation:

$$\underset{CH_3}{\text{Ar}} - N = N - \underset{CH_3}{\text{Ar}} - NH - CHO + COCl_2 + 2(C_2H_5)_3N \longrightarrow$$
(III)

$$\underset{CH_3}{\text{Ar}} - N = N - \underset{CH_3}{\text{Ar}} - NC + CO_2 + 2(C_2H_5)_3N \cdot HCl$$
(IV)

In the above-noted general Formula II, A and A', which may be the same or different, preferably represent, optionally substituted, aromatic radicals containing 5–10 ring members, which aromatic radicals may contain 6–10 carbon atoms or also have a heterocyclic character with at least 2 carbon atoms. The radicals are preferably substituted by one or more of the following substituents: nitrile, halogen, such as chlorine and bromine, nitro, alkyl-carbonyl, aryl-carbonyl, carboxyl, carboxylic acid ester, carbonamide, alkoxy, aryloxy, alkyl-mercapto, arylmercapto, alkyl-sulfone, aryl-sulfone, sulfonic acid, aryl-sulfonic ester, sulfonamide, aryl-azo, acylamino, dialkylamino, alkyl, cycloalkyl, aralkyl, aryl or haloalkyl. If the partciular substituents contain alkyl radicals, then these generally contain between 1–6 carbon atoms. If the particular substituents contain aryl groups, then these generally contain between 6–10 carbon atoms.

The group of general Formula V, mentioned below, can also represent an, optionally substituted, benzotriazole radical of the general Formula VI:

$$-A'-N=N- \qquad R-\underset{(-)}{\overset{N}{\underset{N}{\bigwedge}}}\overset{(+)}{\underset{N-}{\bigvee}}$$
$$\underset{X}{|}$$
(V)      (VI)

the symbol R representing a substituent of the type defined in the immediately preceding paragraph.

As typical individual examples of the formamides which can be used according to the present invention, there may be mentioned 4-formylamino-azobenzene, 4-formylamino-2,3' - dimethyl - azobenzene, 4 - formylamino-3-methyl-5-ethyl - 4' - nitro - azobenzene, 4 - formylamino - 3,5-diethyl - 3' - chloro - azobenzene, 4 - formylamino - 3'-methoxy - azobenzene - 4' - carboxylic acid methyl ester, ammonoum 4-formylamino-azobenzene-4'-sulfonate, 4-formylamino - 3 - ethoxy - naphthalene - [1 - azo - 3]-(4-methoxy-phenyl)-ethyl sulfone, 2-formylamino-naphthalene - [1 - azo - 4] - acetophenone, 4 - phenylmercapto - 3'-methyl - 4' - formylamino - azobenzene, 4 - formylamino-5,6,7,8 - tetrahydro - naphthalene - [1 - azo - 4] - cyclohexyl-benzene and 3-phenyl-1,2,4-thiadiazole-[5-azo-4]-phenyl isocyanide.

The formamides of the general Formula II which may be used in the process according to the present invention are subjected to the splitting off of water, if desired, either in solution or suspension.

As solvents or dispersing agents, they may be used in accordance with the present invention all inert organic solvents, preferably hydrocarbons, such as aliphatic hydrocarbons or paraffins, including petroleum fractions such as benzine fractions having a boiling point between about 30 and 160° C., especially $C_5$–$C_9$ aliphatic hydrocarbons, and the like; cycloaliphatic hydrocarbons, such as cycloalkyl, and especially cyclo lower alkyl hydrocarbons, including cyclopentane, cyclohexane, and the like; aromatic hydrocarbons, and especially unsubstituted, mono-, di-, and tri-lower alkyl substituted-, and nitro substituted-aryl hydrocarbons having 6 ring carbon atoms, including benzene, toluene, xylene, mesitylene, nitrobenzene, and the like; halogenated hydrocarbons, and especially chlorinated hydrocarbons, including chlorinated aliphatic hydrocarbons, such as methylene chloride, chloroform, carbon tetrachloride, trichloroethylene, tetrachloroethane, and the like; halogenated aromatic hydrocarbons, such as halogen substituted mononuclear aryl hydrocarbons having 6 ring carbon atoms, including mono-, di-, and trichlorobenzene, and the like; ethers, such as open chain aliphatic ethers and cyclic aliphatic ethers, and especially di-$C_1$–$C_6$ lower alkyl ethers, including dimethyl ether, diethyl ether, methylethyl ether, diisopropyl ether, diisobutyl ether, and the like, as well as cycloalkyl ethers, including dioxan, furan, tetrahydrofuran, and the like; esters, and especially $C_1$–$C_4$ alkyl-alkanoyloxy esters, including methyl-, ethyl-, propyl-, butyl-, etc. esters of formic, acetic, propionic, butyric, etc. acids, especially ethyl acetate, and the like; nitriles, and especially aliphatic nitriles, such as alkane nitriles, for example $C_1$–$C_4$ lower alkyl cyanides, including acetonitrile, propionitrile, butyronitrile, and the like; tertiary amines, such as heterocyclic amines, and especially cyclic amines having 6 ring members, including at least one nitrogen atom, including pyridine, as well as tert.-aliphatic amines, such as tri-$C_1$–$C_4$ lower alkylamines, including trimethylamine, triethylamine, tripropylamine, tributylamine, methylethylpropylamine, diethylbutylamine, and the like.

As water-eliminating acyl halides usable in accordance with the present invention, there may be mentioned, by way of example, phosgene, methane-sulfochloride, benzene-sulfochloride, toluene-sulfochloride, phosphorus oxychloride, phosphorus oxybromide and cyanuric chloride. They are used in combination with bases, especially organic bases and particularly tertiary amines, such as tri-methyl- and triethylamine, tetramethyl-ethylene-diamine, dimethyl - cyclohexylamine, dimethyl - benzylamine, pyridine, quinoline, as well as inorganic bases such as alkali metal carbonates, including sodium carbonate, potassium carbonate, lithium carbonate, and the like, and tertiary alcoholates, and especially sodium- -tert.-butylate, potassium- -tert.-butylate, and the like.

Combinations of acyl halides and bases are of special advantage, for example, phosgene and tert.-aliphatic amines, benzene-sulfochloride and pyridine, phosphorus oxychloride and pyridine or potassium tert.-butylate, and cyanuric chloride and potassium carbonate.

The reaction temperatures in accordance with the present invention may vary within a particularly wide range. In general, the reaction is carried out at a temperature substantially between about −50 and +100° C., preferably substantially between about −20 and +60° C.

When carrying out the process according to the present invention, 1 mol of the formamide of the general Formula II may be reacted in 0.5–5 liters of solvent, with 1–5, preferably 1.8–3, equivalents of base, and 0.5–2.5, preferably 0.9–1.5, water equivalents of acyl halide.

It will be appreciated that in accordance with the present invention, the process may be carried out continuously or discontinuously and/or under increased or reduced pressure.

Working up of the formed product takes place in the usual manner, for example, by mixing with water, separation and concentration, or by the addition of ammonia, filtration and concentration. The crude product can be purified by washing out or by crystallization or precipitation, possibly with the use of an absorbing additive.

Typical individual examples of isonitriles contemplated according to the present invention are 4-isocyano-azobenzene,
4-isocyano-2',3-dimethyl-azobenzene,
4-isocyano-3-methyl-5-ethyl-4'-nitro-azobenzene,
4-isocyano-3,5-diethyl-3'-chloro-azobenzene,
4-isocyanobenzene-3'-methoxy-azobenzene-4'-carboxylic acid methyl ester,
ammonium 4-isocyano-azobenzene-4'-sulfonate,
4-isocyano-3-ethoxy-naphthalene-[1-azo-3]-(4-methoxyphenyl)-ethyl sulfone,
2-isocyano-naphthalene-[1-azo-4]acetophenone,
4-phenylmercapto-3'-methyl-4'-isocyanoazobenzene,
4-isocyano-5,6,7,8-tetrahydronaphthalene-[1-azo-4]-cyclohexyl-benzene,
2-isocyano-4-acetyl-methylamino-benzoic acid ethyl ester-[5-azo-2]-4-chlorobenzonitrile,
4-isocyano-4'-dimethyl-amino-azobenzene,
4,4'-diisocyano-azobenzene,
3,3'-diisocyano-6,6'-dichloro-azobenzene,
3,3'-diisocyano-azoxybenzene,
3,3'-diisocyano-4,4'-dimethyl-azoxybenzene,
4,4'-diisocyano-3,3'-dichloro-azoxybenzene,
4,4'-diisocyano-3,3',6,6'-tetrachloro-azoxybenzene,
4,4'-diisocyano-3,3',5,5'-tetrachloro-azoxybenzene.

The particular —N=N— group-containing isonitriles according to the present invention exhibit biocidal properties and are especially effective as insecticides, acaricides and fungicides.

The compounds according to the present invention, while having advantageously a low mammalian toxicity and low phytotoxicity, exhibit strong insecticidal and acaricidal actions or effects. The effects start rapidly and last for a long time. The instant compounds can, therefore, be used with good results for combating noxious sucking and biting insects and diptera, as well as mites.

In this connection, typical sucking insects primarily include herein aphids, such as the peach aphid (*Myzus persicae*); cochineal kermes, such as *Aspidiotus hederae*; Thysanoptera, such as *Hercinothrips femoralis*; and bugs, such as the beet bug (*Piesma quadrata*).

Typical biting insects herein contemplated are essentially butterfly larvae, such as *Plutella maculipennis*; beetles, such as the grain weevil (*Calandra granaria*), but also the species living in the soil, such as the wire worms (*Agriotes sp.*); cockroaches, such as the German cockroach (*Blattella germanica*); Orthoptera, such as the cricket (*Gryllus domesticus*); termites, such as Reticulitermes; and Hymenoptera, such as ants.

Also, the Diptera include, in particular, the flies, such as the fruit fly (*Drosophila melanogaster*), the house fly (*Musca domestica*) and gnats, such as the mosquito (*Aedes aegypti*).

Among mites under consideration herein, especially important are the spider mites (Tetranychidae), such as the common spider mite (*Tetranychus telarius*); gall mites, such as the red current gall mite (*Eriophytes ribis*) and Tarsonemides, such as *Tarsonemus pallidus*, and ticks.

The compounds according to the present invention also exhibit a strong fungitoxic action. Due to their low toxicity toward warm-blooded creatures, they are especially suitable for combating undesired fungus growth. Their good compatibility with higher plants permits their particularly advantageous use as plant protective agents against plant fungus diseases.

The active compounds according to the instant invention can be utilized, if desired, in the form of the usual formulations or compositions with dispersible carrier vehicles, such as solutions, emulsions, suspensions. emulsifiable concentrates, spray powders, pastes, soluble powders, dusting agents, granules, etc. These are prepared in known manner, for instance by extending the active agents with solvents and/or dispersible solid carriers optionally with the use of emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles or assistants for this purpose: solvents, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), ethers, etheralcohols (for instance, glycol monomethyl ether, etc.), amines (for instance, ethanolamine, etc.), amides (for instance, dimethyl formamide, etc.), ketones (for instance, acetone, etc.), and water; dispersible finely divided solid carriers, such as natural ground minerals (for instance, kaolins, alumina, silica, chalk, i.e., calcium carbonate, talc, kieselguhr, etc.), and synthetic ground minerals (for instance, highly dispersed silicic acid, silicates, e.g., alkali silicates, etc.); emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

In general, the compositions or formulations contain substantially between about 0.1 and 95 percent by weight of the active compound, and preferably substantially between about 0.5 and 90 percent by weight.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use. They are applied in the usual manner, for example, by spraying, sprinkling, scattering, dusting and dressing.

The following examples are given for the purpose of illustrating, while not limiting, the present invention, concerning the pesticidal effectiveness of the instant compounds.

Example 1.—Lymantria test

|  | Parts by weight |
| --- | --- |
| Solvent, dimethyl formamide | 3 |
| Emulsifier, alkyl aryl polyglycol ether | 1 |

To produce a suitable preparation of the active compound, 1 part by weight of such active compound is mixed with the stated amount of solvent containing the stated amount of emulsifier, and the concentrate obtained is diluted with water to the desired concentration.

Branches of white hawthorn (*Crataegus monogyna*) are sprayed with the preparation of the active compound until dew moist, and then infested with caterpillars of the gipsy moth (*Lymantria dispar*).

After the specified periods of time, the degree of destruction is determined percentagewise. 100% indicates that all the caterpillars are killed, whereas 0% indicates none are killed.

The active compounds, their concentrations, the evaluation time and the results obtained can be seen from Table 1 which follows:

TABLE 1
[Plant-damaging insects]

| Active compound | Concentration of active compound, percent | Degree of destruction in percent after 72 hours |
| --- | --- | --- |
| (IV') CN—⟨phenyl(CH₃)⟩—N=N—⟨phenyl(CH₃)⟩ | 0.2 | 100 |
| (VII) ⟨phenyl(CN)⟩—N=N(→O)—⟨phenyl(NC)⟩ | 0.2 | 100 |
| (VIII) CN—⟨phenyl(Cl)⟩—N=N(→O)—⟨phenyl(Cl)⟩—NC | 0.2 | 100 |
| n-C₁₂H₂₅—NC (known) | 0.2 | 0 |

Example 2.—Tetranychus test

|  | Parts by weight |
| --- | --- |
| Solvent, dimethyl formamide | 3 |
| Emulsifier, alkyl aryl polyglycol ether | 1 |

To produce a suitable preparation of the active compound, 1 part by weight of such active compound is mixed with the stated amount of solvent containing the stated amount of emulsifier, and the concentrate obtained is diluted with water to the desired concentration.

Bean plants (*Phaseolus vulgaris*), which have a height of approximately 10–30 cm., are sprayed with the preparation of the active material until dripping wet. These bean plants are then heavily infested with bean spider mites (*Tetranychus telarius*) in all stages of development.

After the specified period of time, the effectiveness of the preparation of active compound is determined by counting the dead animals. The degree of destruction thus obtained is determined percentagewise. 100% indicates that all the spider mites are killed, whereas 0% indicates that none are killed.

The active compounds, their concentrations, the evaluation time and the results obtained can be seen from Table 2 as follows:

with an aqueous suspension of 100,000 to 200,000 spores/ml. of *Piricularia oryzae* and placed in a chamber at 24–26° C. and a relative atmospheric humidity of 100%.

Five days after inoculation, the infestation of all leaves of the treated plants which were present at the time of inoculation is determined as a percentage of the untreated but also inoculated control plants. 0% indicates that no infestation occurred and 100% indicates that the infestation is exactly the same as that of the control plants.

TABLE 2

[Plant-damaging mites]

| Active compound | Concentration of active compound, percent | Degree of effectiveness in percent after 48 hours |
|---|---|---|
| (IX)  | 0.2 | 100 |
| (X) 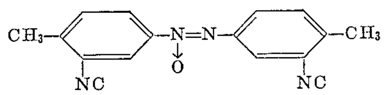  | 0.2 | 100 |
| (VIII') 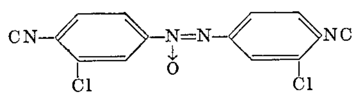  | 0.2 | 100 |
| (XI) 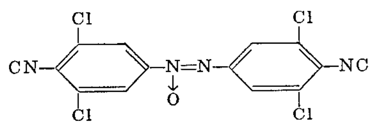  | 0.2 | 100 |
| (XII) 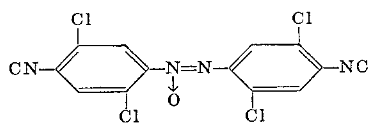  | 0.2 | 100 |
| (XIII) 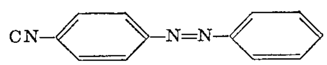  | 0.02 | 100 |
| (IV'') 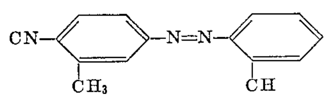  | 0.02 | 100 |
| (VII') 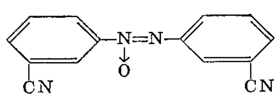  | 0.02 | 100 |
| n-$C_{12}H_{25}NC$ | 0.2 | 0 |
|  | 0.02 | 100 |

Example 3.—Piricularia test/solid preparation of active compound

Solvent, 10 parts by weight acetone
Dust base, 100 parts by weight:
- 95.5 calcium carbonate
- 4.0 silicic acid
- 0.5 magnesium stearate.

The amount of active compound necessary for the desired concentration in the dusting agent is mixed with the stated amount of solvent and the concentrate obtained is triturated in a mortar with the stated amount of dust base unil the solvent has evaporated.

Thirty rice plants which are approximately 14 days old are dusted with this agent. They are then inoculated The active compound, its concentration and the result obtained can be seen from Table 3 set forth below:

TABLE 3

[Piricularia-test/solid preparation of active compound]

| Active Compound | Infestation in percent of infestation of untreated control at a concentration of active compound of 0.05% |
|---|---|
| (XIII')  | 35 |

Example 4.—Inhibition value test

Solvent, 99 parts by weight acetone
Nutrient medium, malt agar.

1 part by weight of the active compound is taken up in the amount of solvent stated above. A sufficient amount of this preparation of the active compound is added to the above-mentioned nutrient medium, which has been liquefied by heating, to produce the desired final concentration. After solidification, the nutrient medium is inoculated with the test fungus.

After a definite period of inoculation, the growth of the test fungus is examined microscopically and, in a series of concentrations, that concentration is determined at which a complete inhibition of the fungus has just occurred. If the concentration of the active compound in the nutrient medium is, for example, 1:1000, then the value 1000 represents the reciprocal inhibition value of the critical concentration.

The test fungus, the inoculation time, and the reciprocal inhibition value of the critical concentration can be seen from Table 4 which follows:

TABLE 4

| Active compound | Test fungus | Inoculation time | Reciprocal inhibition value of the critical concentration |
|---|---|---|---|
| (XIII'') 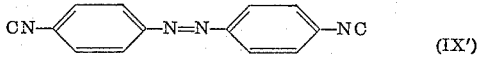 | Aspergillus niger | 10 days | 14,000 |

The following examples are given for the purpose of illustrating, while not limiting, the present invention, concerning the preparation of the instant compounds.

Example 5—4-isocyano-2,3'-dimethyl-azobenzene

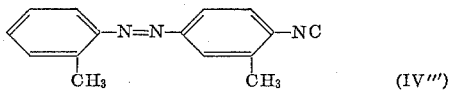

(IV''')

158 parts by weight 4-formylamino-2,3'-dimethylazobenzene, 1500 parts by weight methylene chloride and 150 parts by weight triethylamine are mixed, with cooling and stirring, at about 20° C. with about 72 parts by weight phosgene. Excess phosgene is blown off with nitrogen and 28 parts by weight ammonia are passed into the solution, while cooling with water. The pulpy ammonium chloride which results is filtered off with suction; the filter residue is vigorously washed with methylene chloride, and the filtrate evaporated to dryness in a spray drier at about 30° C. under vacuum. By means of a stirrer device, the remaining product is washed with methanol/light benzine, filtered off with suction and dried at 100° C. under vacuum.

Yield: 121 parts by weight 4-isocyano-2,3'-dimethyl-azobenzene; M.P. 108–110° C.

Example 6.—4,4'-diisocyano-azobenzene

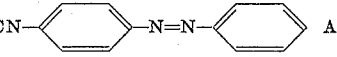

(IX')

236 parts by weight 4,4'-diformylamino-azobenzene, 3,000 parts by weight methylene chloride and 500 parts by weight triethylamine are mixed together. 190 parts by weight phosgene are introduced into such mixture 0° C., with external cooling and stirring. After termination of the cooling, a vigorous evolution of carbon dioxide commences at about 15–20° C., after the abatement of which the reaction mixture is heated to boiling for a further half hour. Final phosgene residues are blown off with nitrogen; the reaction mixture is cooled at 20° C. and hydrolyzed with ice water. After separation of the organic phase, such organic phase is washed twice with water, dried over anhydrous sodium sulfate and evaporated at 30° C. under vacuum in a rotary drier.

Yield: 133 parts by weight 4,4'-diisocyano-azobenzene; decomposition point 195° C.

Example 7.—2,4 - diisocyano - 6 - methyl-3' - trifluoromethyl-4'-chloroazobenzene

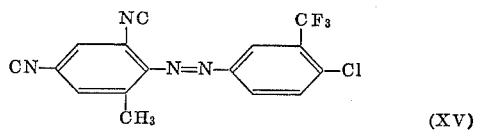

(XV)

384.5 parts by weight 2,4-diformylamino-6-methyl-3'-trifluoromethyl-4'-chloroazobenzene, 3,000 parts by weight methylene chloride and 600 parts by weight N-dimethyl-cyclo-hexylamine are mixed at about 20° C., with stirring and cooling, with about 200 parts by weight phosgene. The procedure is then continued as stated in Example 5 and, for working up, 75 parts by weight ammonia are introduced.

Yield: 196 parts by weight 2,4-diisocyano-6-methyl-3'-trifluoromethyl - 4' - chloro-azobenzene; decomposition point about 160° C.

Example 8.—4 - isocyano - 3 - methyl-5-ethyl-4'-nitro-azobenzene

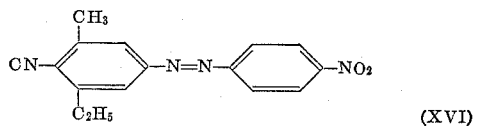

(XVI)

77 parts by weight 4-formylamino-3-methyl-5-ethyl-4'-nitro-azobenzene, 62 parts by weight triethylamine and 1,000 parts by weight methylene chloride are mixed together. 25 parts by weight phosgene are introduced into the resulting mixture at 0° C., with stirring and external cooling. The cooling is then terminated and, after abatement of the carbon dioxide evaolution which commences at 15–20° C., the reaction mixture is heated to boiling for a half hour. Last residues of phosgene are blown off with nitrogen and 9 parts by weight ammonia are introduced into the reatcion mixture which has been cooled to 10° C. The reaction mixture is then filtered off with suction, the ammonium chloride precipitate is vigorously washed with methylene chloride and the organic phase evaporated in a rotary evaporator at 30° C. under vacuum. The crystal mass obtained is then washed by means of a high-speed stirrer with a mixture of ether and light benzine.

Yield: 61 parts by weight 4-isocyano-3-methyl-5-ethyl-4'-nitro-azobenzene; M.P. 133–136° C.

Example 9.—3,3'-diisocyano-4,4'-dimethyl-azoxybenzene

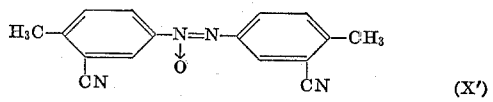

(X')

78 parts by weight 3,3'-diformylamino-4,4'-dimethyl-azoxybenzene, 700 parts by weight methylene chloride and 125 parts by weight triethylamine are mixed together. 50 parts by weight phosgene are introduced into such mixture at +10° C., with stirring and external cooling. The cooling is terminated and, after abatement of the carbon dioxide evolution which sets in at 15–20° C., the reaction mixture is heated to boiling for a half hour. Thereafter 18 parts by weight ammonia are introduced into the reaction mixture which has been cooled to 10° C.

The reaction mixture is then filtered off with suction; the ammonium chloride precipitate is vigorously washed with methylene chloride and the organic phase is evaporated in a rotary evaporator at 30° C. under vacuum. The crude product obtained is recrystallized from light benzine.

Yield: 58 parts by weight 3,3′-diisocyano-4,4′-dimethyl-azoxybenzene; M.P. 130° C.

Example 10.—3,3′,5,5′-tetrachloro-4,4′-diisocyano-azoxybenzene

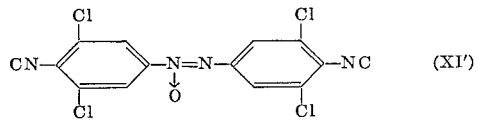

205 parts by weight 4,4′-diformylamino-3,3′,5,5′-tetrachloro-azoxybenzene, 300 parts by weight methylene chloride and 250 parts by weight triethylamine are mixed together. 99 parts by weight phosgene are introduced into the resulting mixture at 10° C., with stirring and external cooling. The cooling is then terminated and, after abatement of the carbon dioxide evolution which commences at 15–20° C., the reaction mixture is heated to boiling for a half hour. Residual phosgene is then blown off with nitrogen and 36 parts by weight ammonia introduced into the reaction mixture, which has been cooled to 10° C. The reaction mixture is then filtered off with suction; the ammonium chloride precipitate is vigorously washed with methylene chloride and the organic phase evaporated in a rotary evaporator at 30° C. under vacuum. The crude product obtained is washed with ether.

Yields: 128 parts by weight 3,3′,5,5′-tetrachloro-4,4′-diisocyano-azoxybenzene; decomposition point 154° C.

Example 11.—5-isocyano-2-phenyl-1,2,3-benzotriazole

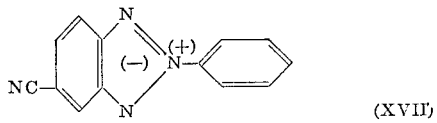

238 parts by weight 5-formylamino-2-phenyl-1,2,3-benzotriazole (M.P. 226–227° C.), 220 parts by weight triethylamine and 1300 parts by weight methylene chloride are mixed together. 100 parts by weight phosgene are introduced into such mixture with ice-cooling and stirring. About 35 parts by weight ammonia are subsequently introduced, the reaction mixture then filtered and the filtrate evaporated in a vacuum. The reside is triturated with methanol and filtered off with suction.

Yield: 180 parts by weight (82%) 5-isocyano-2-phenyl-1,2,3-benzotriazole; M.P. 157–159° C.

The same reaction can also be carried out at 20° C. with toluene-sulfochloride in pyridine with a yield of 64%, and at 0–10° C. with phosphorus oxychloride in potassium tert.-butylate/tert.-butanol with a yield of 77%.

In accordance with the procedure of Examples 5 to 11, as the case may be, the following isonitrile compounds may also be obtained by the elimination of one molecule of water from each corresponding formylamino group in the corresponding starting azobenzene or azoxy-benzene compound:

4-isocyano-2′,3-dimethyl-azobenzene (Formula IV)
3,3′-diisocyano-azoxybenzene (Formula VII)
4,4′-diisocyano-3,3′-dichloro-azobenzene
4,4′-diisocyano-2,2′-dichloro-azoxybenzene
4-isocyano-azobenzene (Formula XIII)
4,4′-diisocyano-3,3′-dichloro-azoxybenzene (Formula VIII)
4,4′-diisocyano-2,2′,5,5′-tetrachloro-azoxybenzene (Formula XII)
4-isocyano-3,5-diethyl-3′-chloro-azobenzene
4-isocyano-3′-methoxy-azobenzene-4′-carboxylic acid methyl ester
ammonium-4-isocyano-azobenzene-4′-sulfonate
4-isocyano-3-ethoxy-naphthalene-[1-azo-3]-(4-methoxy-phenyl) ethyl sulfone
2-isocyano-naphthalene-[1-azo-4]-acetophenone
4-phenylmercapto-3′-methyl-4′-isocyano-azobenzene
4-isocyano-5,6,7,8-tetrahydro-naphthalene-[1-azo-4]-cyclohexyl-benzene
2-isocyano-4-acetyl-methylamino-benzoic acid ethyl ester-[5-azo-2]-4-chloro-benzonitrile
4-isocyano-4′-dimethylamino-azobenzene
5,5′-diisocyano-2,2′-dichloro-azobenzene
4,4′-diisocyano-2,2′,5,5′-tetrachloro-azoxybenzene
3-phenyl-1,2,4-thiadiazole-[5-azo-4]-phenyl-isocyanide Generally, in the foregoing Formula I, the substituents A and A′ contemplate divalent aromatic radicals, and especially arylene radicals, which may be heterocyclic in character or which may contain only ring carbon atoms. Such radicals may contain 5–10 ring members, especially where heterocyclic radicals are concerned, and more particularly 6–10 ring carbon atoms where only carbon atoms are present in the particular ring. Of course, where one of the symbols $m$ and $n$ in Formula I above has a value of 0, then the particular radical A or A′ will not be a divalent aromatic radical necessarily but may be instead a monovalent aromatic radical or monovalent aryl radical. More particularly, such radicals include phenylene, phenyl, naphthylene, naphthyl, tetrahydronaphthylene, tetrahydronaphthyl, thiadiazole, and the like.

It will be understood that where X represents a nitrogen atom connected with the moiety A′, a ring will be formed, such as a 1,2,3-benzotriazole ring, which will contain one or more isocyano groups, as is true of the foregoing radicals contemplated by A and A′.

Among the particular substituents besides the isocyano group (or formylamino group in the starting compound) which may be present on the radicals A and A′ are the following:

Halo, including chloro, bromo, iodo, fluoro, and mixtures thereof;

Nitro (—$NO_2$);

Alkyl-carbonyl or alkanoyl, and especially lower alkanoyl, such as $C_1$–$C_6$ alkyl carbonyl, including aceto, propionyl, butyryl, pentanoyl, hexanoyl, and the like, and mixtures thereof (alkyl-CO—);

Aryl-carbonyl, and especially aryl carbonyl having 6–10 ring carbon atoms, such as phenyl carbonyl radicals and naphthyl carbonyl radicals, including benzoyl, and the like, and mixtures thereof aryl-CO—);

Carboxyl (HOOC—);

Carboxylic acid ester or carboalkoxy, and especially lower alkyl esters, such as $C_1$–$C_6$ alkyl esters of carboxylic acid, including carbo-methoxy, carbo-ethoxy, carbo-n-propoxy, carbo-isopropoxy, carbo-n-butoxy, carbo-isobutoxy, carbo-sec.-butoxy, carbo-tert.-butoxy, carbo-amyloxy, carbo-hexyloxy, and the like, and mixtures thereof (alkyl-OOC—);

Carbonomide or carboxamide ($NH_2$—CO—);

Alkoxy, and especially lower alkoxy, such as $C_1$–$C_6$ alkoxy, including methoxy, ethoxy, n-propoxy, isoproyoxy, n-butoxy, isobutoxy, sec.-butoxy, tert.-butoxy, amyloxy, hexyloxy, and the like, and mixtures thereof (alkyl-O—);

Aryloxy, and especially aryloxy having 6–10 ring carbon atoms, i.e., and an oxygen atom on the ring having a free radical, including phenoxy, naphthyloxy radicals, and the like, and mixtures thereof (aryl-O—);

Alkylmercapto, especially lower alkylmercapto, such as $C_1$–$C_6$ alkylmercapto, including methylmercapto, ethylmercapto, n-propylmercapto, isopropylmercapto, n-butylmercapto, isobutylmercapto, sec.-butylmercapto, tert.-butylmercapto, amylmercapto, hexylmercapto, and the like, and mixtures thereof (alkyl-S—);

Arylmercapto, and especially arylmercapto having 6–10 ring carbon atoms, i.e., and a sulfur atom on the ring having a free radical, including phenylmercapto and naphthylmercapto radicals, and the like, and mixtures thereof (aryl-S—);

Alkyl-sulfone, and especially lower alkyl-sulfone, such as $C_1$–$C_6$ alkyl-sulfone, including methyl-sulfone, ethyl-sulfone, n-propyl-sulfone, isopropyl-sulfone, n-butyl-sulfone, isobutyl-sulfone, sec.-butyl-sulfone, tert.-butyl-sulfone, amyl-sulfone, hexyl-sulfone, and the like, and mixtures thereof (alkyl-$SO_2$—);

Aryl-sulfone, and especially aryl-sulfone having 6–10 ring carbon atoms, i.e., and a sulfonyl group on the ring having a free radical, including phenyl-sulfonyl and naphthyl-sulfonyl radicals, and the like, and mixxtures thereof (aryl-$SO_2$—);

Sulfonic acid alkali salt, and especially alkali metal and ammonium sulfonic acid salts, such as sodium, potassium, lithium, and the like, and ammonium sulfonic acid salts, and mixtures thereof (alkali-O—$SO_2$—);

Alkyl sulfonic acid, and especially lower alkyl sulfonic acid, such as $C_1$–$C_6$ alkyl sulfonic acid, including methyl to hexyl (inclusive) sulfonic acid, and the like, and mixtures thereof (alkyl-O—$SO_2$—);

Aryl-sulfonic acid, and especially aryl sulfonic acid having 6–10 ring carbon atoms, i.e., and a sulfo group on the ring having a free radical, including benzene sulfonic acid and naphthalene sulfonic acid, and the like, and mixtures thereof (aryl-O—$SO_2$—);

Sulfonamide or sulfamine ($NH_2$—$SO_2$—);

Acylamino, and especially alkanoyl amino, such as $C_1$–$C_6$ alkyl carbonyl amino, including acetyl amino, propionyl amino, butyryl amino, pentanoyl amino, hexanoyl amino, and the like, and mixtures thereof (alkyl-CO—NH—);

Acyl-alkyl-amino, and especially alkanoyl-alkyl-amino, such as $C_1$–$C_6$ alkyl-carbonyl-alkyl-amino, including acetyl-methyl-amino, acetyl-(ethyl to hexyl inclusive)-amino, propionyl-(methyl to hexyl inclusive)-amino, butyryl-(methyl to hexyl inclusive)-amino, pentanoyl-(methyl to hexyl inclusive)-amino, hexanoyl-(methyl to hexyl inclusive)-amino, and the like, and mixtures thereof (alkyl-CO—N(alkyl)—);

Dialkylamino, and especially dilower alkylamino, such as di-$C_1$–$C_6$-alkylamino, including dimethyl-, diethyl-, di-n-propyl-, diisopropyl-, di-n-butyl-, diisobutyl-, di-sec.-butyl-, di-tert.-butyl, methyl-n-butyl-, ethyl-isopropyl-, tert.-butylhexyl- etc. -amino, and the like, and mixtures thereof (alkyl–N̶–alkyl)

Alkyl, and especially lower alkyl, such as $C_1$–$C_6$ alkyl, including methyl, ethyl, n-propyl, isopropyl, n-butyl, isobutyl, sec.-butyl, tert.-butyl, pentyl, hexyl, and the like, and mixtures thereof (alkyl);

Cycloalkyl, and especially cyclolower alkyl, such as $C_5$–$C_6$ lower alkyl, including cyclopentyl, cyclohexyl, and the like, and mixtures thereof (cycloalkyl);

Aralkyl, and especially aralkyl having 6–10 ring carbon atoms and an alkyl substituent with 1–6 carbon atoms in the alkyl chain and a free radical, including benzyl, phenyl-ethyl, phenyl-propyl, phenyl-butyl, phenyl-pentyl, phenyl-hexyl radicals, and the like, and naphthyl-methyl, naphthyl-ethyl, naphthyl-propyl, naphthyl-butyl, naphthyl-pentyl, naphthyl-hexyl radicals, and the like, and mixtures thereof (aralkyl);

Aryl, and especially aryl having 6–10 ring carbon atoms, such as phenyl, naphthyl, and the like, and mixtures thereof (aryl);

Haloalkyl, and especially halo lower alkyl, such as halo-$C_1$–$C_6$ alkyl, including mono-, di-, tri-, and poly- chloro, bromo, iodo, and fluoro-substituted- and mon-, di-, tri-, and poly- mixed chloro, bromo, iodo, and fluoro-substituted- methyl, ethyl, n-propyl, isopropyl, n-butyl, isobutyl, sec.-butyl, tert.-butyl, pentyl, hexyl, and the like, and particularly trifluoromethyl, and mixtures thereof (haloalkyl).

Each of the symbols A and A' in the foregoing formulae particularly contemplates a phenyl ring, or naphthyl ring, or tetrahydronaphthyl ring, or thiadiazole ring, or the like, and A' taken together with X, when X is nitrogen, particularly contemplates a benzotriazole ring, all such rings either being unsubstituted, except for at least one isocyano group in the molecule or group, or correspondingly being optionally mono-, di-, tri-, or poly- substituted with at least one of the following groups or mixtures of such groups:

$C_1$–$C_4$ alkyl, such as methyl and/or ethyl; halo, such as chloro and/or bromo; halo-$C_1$–$C_4$ alkyl, such as trifluoromethyl; nitro; $C_1$–$C_4$ alkoxy, such as methoxy and/or ethoxy; carbo-$C_1$–$C_4$ alkoxy, such as carbomethoxy and/or carboethoxy; $C_1$–$C_4$ alkanoyl, such as aceto; alkali sulfonate, such as ammonium sulfonate; sulfone, such as ethyl sulfonyl; arylmercapto having 6 ring carbon atoms, such as phenylmercapto; cyclo-$C_5$–$C_6$ alkyl, such as cyclohexyl; amino, such as acetyl-methyl-amino and/or dimethyl-amino;

aryl having 6 ring carbon atoms, such as phenyl; and the like.

In accordance with the present invention, therefore, a process may now be provided for the production of azo-(—N=N—)-group-containing isonitriles or isocyanides of Formula I above, in which A and A' each respectively is selected from the group consisting of unsubstituted divalent aromatic radicals or arylene radicals, such as phenylene, naphthylene, tetrahydronaphthalene, thiadiazole, and the like; unsubstituted monovalent aromatic radicals or aryl radicals, such as phenyl, naphthyl, tetrahydronaphthyl, thiadiazole, and the like; substituted divalent aromatic radicals or monovalent radicals of the foregoing type; the particular radical A or A' being monovalent aromatic or aryl in those instances where one of the symbols $m$ and $n$ is 0 and where such radical is not further substituted. Among the substituents which may be present in addition to the isonitrile or isocyanide group or groups are those selected from the group consisting of halo, nitro, alkanoyl, arylcarbonyl, carboxyl, carboalkoxy, carboxamido, alkoxy, aryloxy, alkylmercapto, arylmercapto, alkyl sulfone, aryl sulfone, sulfonic acid alkali metal salt, aryl sulfonic acid, sulfonamido, acylamino, dialkylamino, alkyl, cycloalkyl, aralkyl, aryl, haloalkyl, and mixtures thereof. The symbol X, of course, in the foregoing formulae is selected from the group consisting of a free electron pair, an oxygen atom [i.e., which may be connoted in connection with the azo group in question as —N(O):N—], and a nitrogen atom connected with A' to form a ring, such as a benzotriazole ring system. The symbols $m$ and $n$ each is a whole number having a value of 0 to 4 with the sum of both symbols being 1 to 4, such that as the artisan will appreciate at least one such isonitrile or isocyanide group must be present on at least one of the A and A' moieties, with the total number of such isocyanide or isonitrile groups on both A and A' moieties being at most 4.

The instant process, of coure, is versatile and efficient in that the starting formylamino compound is subjected to water elimination in the presence of a water-eliminating acyl halide together with a base, optionally in a solution or suspension, and especially in an inert organic solvent. Temperatures substantially between about —50 and +100° C. may be used, i.e., temperatures well below 0° C. and well above 0° C., and even up to the boiling temperature of water. Particularly, for each mol of starting formamide reacted, substantially about 0.5–5 liters of solvent with substantially about 1–5 equivalents of base and substantially about 0.5–2.5 water equivalents of acyl halide should be present.

In particular, azo group-containing isonitriles of the general formula

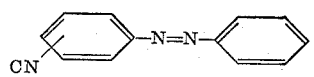

or of the general formula

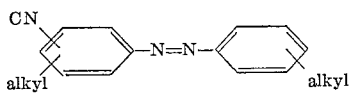

or of the general formula

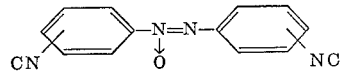

or of the general formula

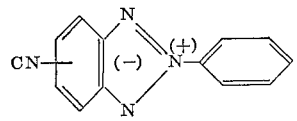

are contemplated herein and such isonitriles are particularly effective as biocides.

Compounds specifically contemplated herein include, therefore:

2',3-dimethyl-4-isocyano-azobenzene
3,3'-diisocyano-azobenzene
3,3'-dichloro-4,4'-diisocyano-azobenzene
4,4'-diisocyano-azobenzene
3,3'-diisocyano-4,4'-dimethyl-azoxybenzene
3,3',5,5'-tetrachloro-4,4'-diisocyano-azoxybenzene
2,2'5,5'-tetrachloro-4,4'-diisocyano-azoxybenzene
4-isocyano-azobenzene
2,3'-dimethyl-4-isocyano-azobenzene
2,4-diisocyano-6-methyl-3'-trifluoromethyl-4'-chloro-azobenzene
3-methyl-4-isocyano-5-ethyl-4'-nitro-azobenzene
2-phenyl-5-isocyano-1,2,3-benzotriazole.

Significantly, biocidal compositions comprising a mixture of a carrier vehicle, and especially a dispersible carrier liquid or dispersible carrier solid, together with a biocidally effective amount of an azo group-containing isonitrile of the instant type may be used with pronounced effectiveness, especially where the amount of isonitrile compound present in the mixture ranges in percent by weight between about 0.1 to 95%, but in particular applications more especially in percentages of 0.001–95%. More particularly, in accordance with a specific embodiment of the invention, effective concentrations of the biocidally active isocyanide compound between about 0.001–5.0%, and more especially between about 0.01–1.0%, by weight of the mixture with the appropriate carrier vehicle have been found to be usable for achieving the desired biocidal results.

Thus, the present invention provides a method of combating members of lower biological orders, which comprises applying to such member and its habitat a biocidally effective amount of an isocyanide compound of the instant type. More particularly, the present invention contemplates a method of combating pests or fungi by applying to such pests or fungi and their habitat a pesticidally or fungicidally effective amount of the isocyanide compound of the present invention utilized. Insects, acarids, and fungi may now, therefore, be controlled by suitable application of compounds of the instant type, and especially regarding crop control agents, the instant compounds are particularly valuable as plant protection agents, not only with respect to plant fungus diseases but also with respect to insects and acarids which might otherwise infest and damage plants, and more especially agricultural crops. Each of the compounds contemplated broadly and specifically in accordance with the foregoing is biocidally effective for the purposes stated. Especially effective are compounds of the Formulae IV, VII, XIII, and XVII.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Azo group-containing isonitriles of the formula

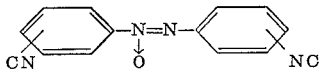

2. 3,3'-diisocyano-azoxybenzene having the formula

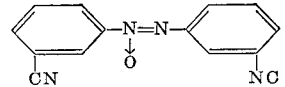

3. 3,3'-dichloro-4,4'-diisocyano-azoxybenzene having the formula

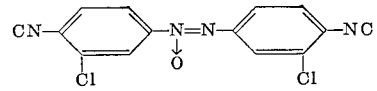

4. 3,3'-diisocyano-4,4'-dimethyl-azoxybenzene having the formula

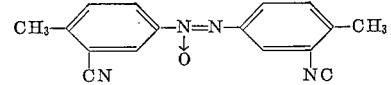

5. 3,3',5,5'-tetrachloro-4,4'-diisocyano-azoxybenzene having the formula

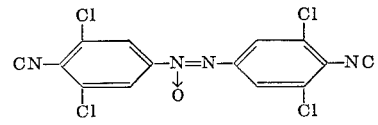

6. 2,2',5,5'-tetrachloro-4,4'-diisocyano-azoxybenzene having the formula

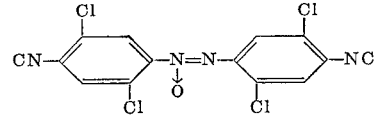

7. 2,4-diisocyano-6-methyl-3'-trifluoromethyl-4'-chloro-azobenzene having the formula

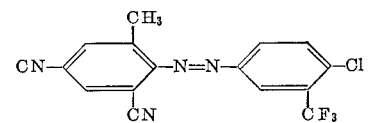

8. 3-methyl-4-isocyano-5-ethyl-4'-nitro-azobenzene having the formula

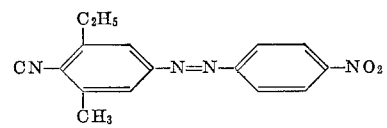

9. Azo group-containing isonitriles of the formula

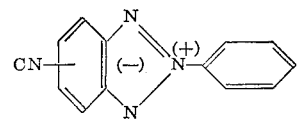

10. 2-phenyl-5-isocyano-1,2,3-benzotriazole having the formula

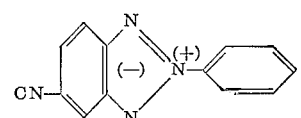

(References on following page)

References Cited

UNITED STATES PATENTS

| | | | |
|---|---|---|---|
| 2,967,858 | 1/1961 | Merian et al. | 260—205 |
| 3,050,516 | 8/1962 | Merian et al. | 260—205 |
| 3,092,545 | 6/1963 | Williamson | 167—33 |
| 3,130,123 | 4/1964 | Weiss et al. | 167—33 |

OTHER REFERENCES

Beilstein, "Handuch Der Organischen Chemie," vol. 16, pp. 646 and 648 (1933) OD 251.B4.

Beilstein, "Handuch Der Organischen Chemie," vol. 16, 2nd supp., p. 336 (1951) OD 251.B4.

Carey et al., J. Am. Chem. Soc., vol. 81, pp. 5209–5212 (1959) OD 1.A5.

Cullen et al., Can. J. Chem., vol. 39, pp. 862–869 (1961) OD 1.C2.

Mataar, Rec. Trav. Chim., vol. 41, pp. 24–37 (1922) OD 1.O9.

Passerini, C. A., vol. 15, p. 2279 (1921) OD 1.A51.

Vgi et al., Ber. Dent. Chem., vol. 93, pp. 239–248 (1960) OD 1.D4.

Vgi et al., Ber. Dent. Chem., vol. 94, pp. 2814–2816 OD 1.D4.

Hutler et al., J. Org. Chem., vol. 23, pp. 1221–1222 (1958) OD 241.J6.

FLOYD D. HIGEL, *Primary Examiner.*

260—158, 192, 196, 199, 205, 207, 207.1, 308, 583; 167—30, 33